Sept. 15, 1931.   C. E. ENNIS ET AL   1,822,962
CHARGE HUMIDIFIER FOR EXPLOSIVE ENGINES
Filed July 9, 1929
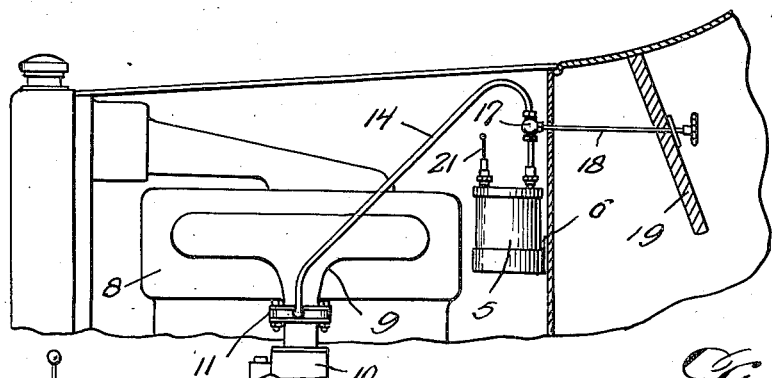
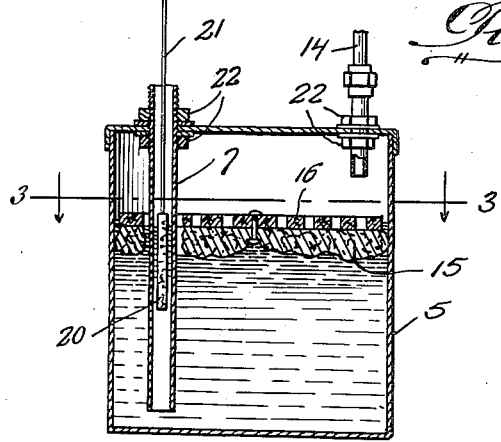
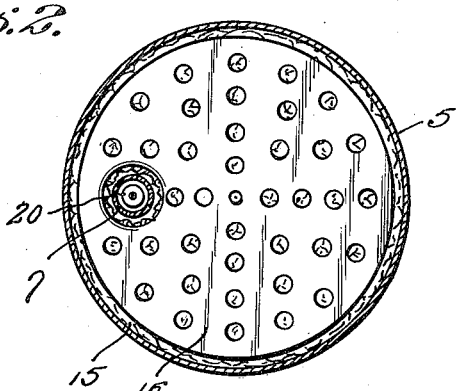
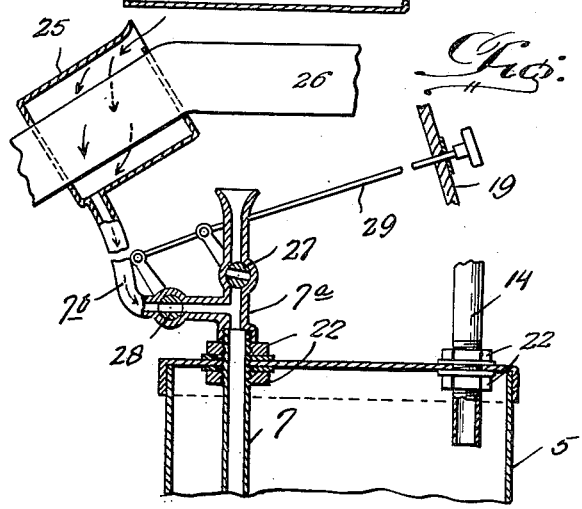
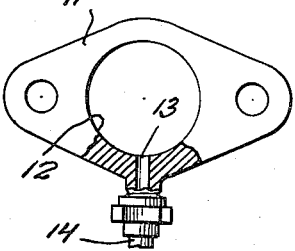
Charles E. Ennis,
Harry W. Crawford,
INVENTOR.
BY J. Stanley Birch
ATTORNEY.

Patented Sept. 15, 1931

1,822,962

UNITED STATES PATENT OFFICE

CHARLES EDWARD ENNIS, OF EL PASO, TEXAS, AND HARRY WALLACE CRAWFORD, OF ALBUQUERQUE, NEW MEXICO

CHARGE HUMIDIFIER FOR EXPLOSIVE ENGINES

Application filed July 9, 1929. Serial No. 376,977.

This invention relates to an improved charge humidifier for explosive engines, and has more particular reference to a device for delivering humidified air into the intake manifold of an engine to be mixed with the explosive charges.

An object of our invention is to provide an improved device of the above kind in which efficient means is provided for preventing passage of an excess amount of moisture into the intake manifold of the engine, while insuring delivery of air, properly moistened or humidified, into such manifold.

A further object is to provide means to manually control the amount of humidified air admitted to the intake manifold, and to provide an efficient device which is simple and durable in construction and easy to install.

Other objects will appear as the nature of the invention is better understood, and the same consists in the novel form, combination and arrangement of parts hereinafter more fully described, shown in the accompanying drawings, and claimed.

In the drawings:

Figure 1 is a fragmentary view, partly in side elevation and partly in section, showing the present invention applied to an automobile.

Figure 2 is a vertical sectional view of the water reservoir of the embodiment of the invention shown in Figure 1.

Figure 3 is an enlarged horizontal section taken on line 3—3 of Figure 2.

Figure 4 is a view, partly in elevation and partly in section, of the gasket or plate through which the humidified air is delivered into the intake manifold; and Figure 5 is a fragmentary view, partly broken away and in section and partly in elevation, showing a modification of the present invention.

Referring in detail to the drawings, the present invention includes a water reservoir or tank 5 which may be suitably mounted on the dash 6 of the automobile. This tank is adapted to be partially filled with water, and is provided with an air intake pipe 7 leading through the top wall of the tank downwardly into the water to a point adjacent the bottom of the tank.

The engine of an automobile is shown at 8, the intake manifold of the engine at 9, and the carburetor thereof at 10. Between the outlet of said carburetor and the inlet of said intake manifold, there is clamped a gasket or plate 11 formed with a central opening 12 registering with the mixture passage of said carburetor and manifold. One side of the plate 11 is formed with a passage 13 which leads from the outer edge of said plate and opens into the central opening 12. A metal tube 14 is suitably coupled at one end to the plate 11 in communication with the passage 13, and said tube has its other end extended through the top wall of tank 5 so as to terminate therein above the level of the water or near the top of said tank. A sheet of sponge or equivalent capillary material 15 is arranged in the tank 5 and adapted to float near the top of the water therein so as to divide the tank into a lower water compartment and an upper air compartment for a purpose that will later become apparent. If found desirable or necessary, the sponge sheet 15 may be attached to the under side of a perforated float disk 16, of cork or the like, so that said sponge will always remain near the surface of the water. Arranged in the tube 14 is a valve 17 having a stem 18 extending through the instrument board 19 of the automobile, so that the driver may readily control the amount of humidified air delivered to the intake manifold of the engine.

In operation, the tank 5 is partly filled with water introduced through pipe 7, and the sponge 15 becomes moistened therewith. The engine creates a partial vacuum in the pipe 14, which draws air into pipe 7, through the water, and then through the wet sponge into the air space or compartment above said sponge. This air is then drawn from such air space or compartment through pipe 14 into the intake manifold for being mixed with the explosive charges which pass through the latter. As the air passes through the water and then through the sponge, it carries the moisture with it. This and the capillary action of the sponge insures maintenance of the air in a humidified condition within the top of the tank 5, and yet the sponge effectively prevents flow of water alone or excess moisture in the pipe 14 and to the engine manifold. By adjusting the valve 17, the amount of humidified air delivered to the engine may be regulated to secure proper operation under different atmospheric or weather conditions.

A suitable gage may be employed to show the level of the water in the tank 5 and enable the user to readily determine when such water needs replenishing. As shown, this gage may embody a float 20 vertically movable in the pipe 7 and having an indicating stem 21 projecting upwardly through and above the upper end of said pipe. The pipes 7 and 14 are clamped as at 22 to the top wall of tank 5 where they pass therethrough.

From the above description, it will be readily seen that we have provided a simple, durable and efficient device which may be easily installed, and by means of which the efficiency of an engine will be greatly increased. In fact, use of the device results in a reduction of the formation of free carbon so that the necessity of cleaning spark plugs and removing other carbon deposits is practically eliminated.

In the embodiment of the invention shown in Figure 5, the air intake pipe 7 has a branched inlet, one branch 7a opening direct to the atmosphere to take in cool air, and the other branch 7b leading from a heating drum 25 surrounding the exhaust manifold 26 of the engine. Arranged in the branches 7a and 7b are valves 27 and 28 operable by a rod 29 from the driver's seat so as to open one and simultaneously close the other, and vice versa. By opening the valve 28 and closing valve 27, hot air may be supplied to tank 5 for being moistened and delivered to the engine in cold weather. By opening valve 27 and closing valve 28, unheated air may be supplied to tank 5 for being moistened and delivered to the engine in hot weather. The liquid level gage of Figure 1 would be omitted in this form of the invention, but otherwise both forms are alike. Heated or unheated moistened air can thus be selectively introduced into the intake manifold to insure maximum efficiency in different seasons or under different temperatures.

What we claim is:

1. A device to supply humidified air to the intake manifold of an explosive engine by inspiration, comprising a closed tank adapted to be partly filled with water, an air intake pipe leading into said tank in proximity to the bottom thereof and below the level of the water, a conduit leading from the tank above the level of said water to said engine intake manifold, and a sheet of capillary material arranged in the tank to float in and near the surface of said water and dividing said tank into upper and lower air and water spaces, respectively, and a perforated float disk fitted for vertical movement in said tank and having said sheet of capillary material attached to the under side thereof.

2. A device operable selectively to supply humidified heated air or humidified unheated air to the intake manifold of an explosive engine by inspiration, comprising a closed tank adapted to be partly filled with water, an air intake pipe leading into said tank in proximity to the bottom thereof and below the level of said water, said air intake pipe having a branched inlet, an air heating drum adapted for association with the exhaust manifold of the engine and having one branch of said inlet connected thereto, the other branch of said inlet opening directly to the atmosphere, valves in said branches of the inlet operable respectively to permit the supply of heated or unheated air to said tank, and a conduit leading from the tank above the level of said water to said engine intake manifold, a sheet of capillary material arranged in the tank to float in and near the surface of the water and prevent passage of water alone or excess moisture into said conduit, and a valve for controlling the amount of humidified air passing through said conduit to said intake manifold.

In testimony whereof we affix our signatures.

CHARLES EDWARD ENNIS.
HARRY WALLACE CRAWFORD.